United States Patent
Blum et al.

(10) Patent No.: US 6,685,139 B2
(45) Date of Patent: Feb. 3, 2004

(54) EMERGENCY OPENING CYLINDER OF A PASSENGER DOOR FOR AN AIRPLANE, A DOOR SYSTEM AND A METHOD OF MODIFYING A DOOR SYSTEM

(75) Inventors: Stefan Blum, Oettingen (DE); Thomas Nickl, Treuchtlingen (DE); Wolfgang Spellmeier, Donauwoerth (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/319,808

(22) Filed: Dec. 16, 2002

(65) Prior Publication Data

US 2003/0132347 A1 Jul. 17, 2003

(30) Foreign Application Priority Data

Dec. 14, 2001 (DE) .......................... 101 61 562

(51) Int. Cl.⁷ ................................ B64C 1/14
(52) U.S. Cl. ................ 244/129.5; 49/246; 91/402
(58) Field of Search .................. 244/129.4, 129.5, 244/118.5; 267/64.28; 91/402; 16/366; 49/246, 339, 386, 248; 74/105–106

(56) References Cited

U.S. PATENT DOCUMENTS

| | | | | |
|---|---|---|---|---|
| 2,505,771 A | * | 5/1950 | Hoar et al. | 91/402 |
| 3,845,694 A | * | 11/1974 | Berg | 91/402 |
| 3,853,368 A | * | 12/1974 | Eichelsheim | 91/402 |
| 4,323,002 A | * | 4/1982 | Wake | 91/402 |
| 4,910,961 A | * | 3/1990 | Ribaudo | 91/402 |
| 5,289,615 A | * | 3/1994 | Banks et al. | 244/129.5 |
| 5,379,971 A | * | 1/1995 | Kim et al. | 244/129.5 |
| 5,704,569 A | * | 1/1998 | Daniels | 244/129.5 |

FOREIGN PATENT DOCUMENTS

| | | |
|---|---|---|
| EP | 0116226 | 8/1984 |
| EP | 0723083 | 7/1996 |

* cited by examiner

*Primary Examiner*—Galen L. Barefoot
(74) *Attorney, Agent, or Firm*—Crowell & Moring LLP

(57) ABSTRACT

An emergency opening cylinder of a passenger door of an airplane is provided. An existing emergency opening cylinder is adapted at the lowest expenditures and with an insignificant increase in weight with respect to its operating characteristic to the load situation of an emergency opening of the door against the force of gravity. A ventilation bore of the emergency opening cylinder leads into a collecting chamber which has an outlet valve controllable by a control.

12 Claims, 1 Drawing Sheet

EMERGENCY OPENING CYLINDER OF A PASSENGER DOOR FOR AN AIRPLANE, A DOOR SYSTEM AND A METHOD OF MODIFYING A DOOR SYSTEM

BACKGROUND AND SUMMARY OF THE INVENTION

This application claims the priority of Application No. 101 61 562.0, filed Dec. 14, 2001, in Germany, the disclosure of which is expressly incorporated by reference herein.

The invention relates to a gas-operated emergency opening cylinder having a piston rod for swivelling a passenger door of an airplane, the emergency opening cylinder being a component of an emergency opening system of the passenger door, and the emergency opening cylinder being arranged on a carrying arm bearing and carrying the door, and the piston rod being connected with the door, and the emergency opening cylinder having a ventilation bore in the end area of its cylinder space through which the piston passes.

The passenger door of an airplane is movably connected with a carrying arm by way of two fittings, for example, triangular control arms. The opposite end of the carrying arm is swivellably disposed in a fuselage-side frame. During the opening operation, the passenger door is lifted after the unlocking operation and, from the end of the lifted position, is swiveled into an opening position to a stop. In this case, the door is swiveled out of the opening of the fuselage. The emergency opening cylinder corresponds to an actuator which is held and disposed at the carrying arm, and its piston rod is connected with the interior side of the passenger door by means of a separate fitting.

The passenger plane has an emergency opening system for the passenger door. In the event of an emergency landing, it has to be possible to open the passenger door within a few seconds and an emergency slide has to be moved out at the door. Such an emergency opening of the passenger door takes place by means of a gas-operated actuator on the carrying arm which, by way of a lever mechanism, changes the passenger door from the end position of the lifting operation into a swivelling movement and carries out this swivelling movement to a stop. This actuator has a gas reservoir. The compressed gas stored there has the energy required for an emergency opening operation of the passenger door. When the gas tank of the actuator is opened, the gas flows into a cylinder of the actuator. This is the emergency opening cylinder. The piston with the piston rod arranged in the cylinder is moved as the result of the gas pressure, and the piston rod starts to swivel the passenger door into the opening position. After the end of the lifting movement of the piston rod, the piston has reached a position in the cylinder where it opens up a bore in the cylinder wall. This ventilation bore connects the cylinder space with the outer atmosphere, so that the gas can escape into the atmosphere. The ventilation bore in the emergency opening cylinder is required in order to be able to close the passenger door without any significant expenditure of force after the emergency opening has taken place. Emergencies considered so far are controllable.

In the event of an emergency landing with a left-hand breakage of the landing gear, the passenger door or similar device (service door or emergency exit door) arranged on the left fuselage side can be opened up at a low expenditure of force to a swivelling angle of 90° (movement along the force of gravity). Viewed in the flying direction, the left-hand fuselage side is defined as the left fuselage side. After a swivelling angle of 90°, the door must then be opened against the force of gravity. This requires an emergency opening cylinder which will function also in this case. In the case of the previous operating characteristic of the emergency opening cylinder, the gas pressure and thus the available opening force had already fallen toward the 0 value at a door opening angle of 120°. The cause was the opening-up of the ventilation bore by the piston and the escape of the gas into the atmosphere.

Because of the possible inclination in the case of a one-sided and left running gear breakage in the case of an emergency landing, starting at an opening angle of 90°, the door has to be opened against the force of gravity. This means that the existing piston rod of the emergency opening cylinder requires an additional increased force in its previous end area.

An actuator (emergency opening cylinder) is required which, particularly in the last path section of the piston with the piston rod, can accelerate against the force of gravity.

The exchange of the known emergency opening cylinder against an energetically intensified emergency opening cylinder would be obvious but has the disadvantage of an increased weight and of higher costs.

It is an object of the invention to adapt the existing emergency opening cylinder at the lowest expenditures and with an insignificant change of weight with respect to its operating characteristic to the load situation of an emergency opening of a passenger door against the force of gravity.

In the case of an emergency opening cylinder of the above-mentioned type, this object is achieved by providing a gas operated emergency opening cylinder having a piston rod for swivelling a passenger door of an airplane, the emergency opening cylinder being a component of an emergency opening system of the passenger door, the emergency opening cylinder being arranged in use on a carrying arm bearing and carrying the door with the piston rod being connected with the door, the emergency opening cylinder having a ventilation bore in an end area of its cylinder space through which the piston rod passes, wherein the ventilation bore leads into a collecting chamber which has an outlet valve controllable by a control.

In a mouth area of the ventilation bore, a collecting chamber is arranged which has a controllable outlet valve, so that the ventilation bore leads into the collecting chamber. The collecting chamber rests form-fittingly and sealingly on the surface area of the emergency opening cylinder. The collecting chamber may, for example, have a U-shaped cross-section and a ring-shaped construction. Such a ring-shaped, collar-shaped collecting chamber may be pushed in the axial direction onto the surface area of the emergency opening cylinder and cover the area of the ventilation bore. A controllable outlet valve, which is connected with a control, is arranged in the wall of the collecting chamber. The outlet valve closes and opens the valve duct between the collecting chamber and the outer atmosphere. The outlet valve is closed and, with the passing of the ventilation bore by the piston head, a control opens the outlet valve only after a time delay or after the completion of a subsequent piston travel.

Other objects, advantages and novel features of the present invention will become apparent from the following detailed description of the invention when considered in conjunction with the accompany drawings.

DETAILED DESCRIPTION OF THE DRAWINGS

Figure 1:
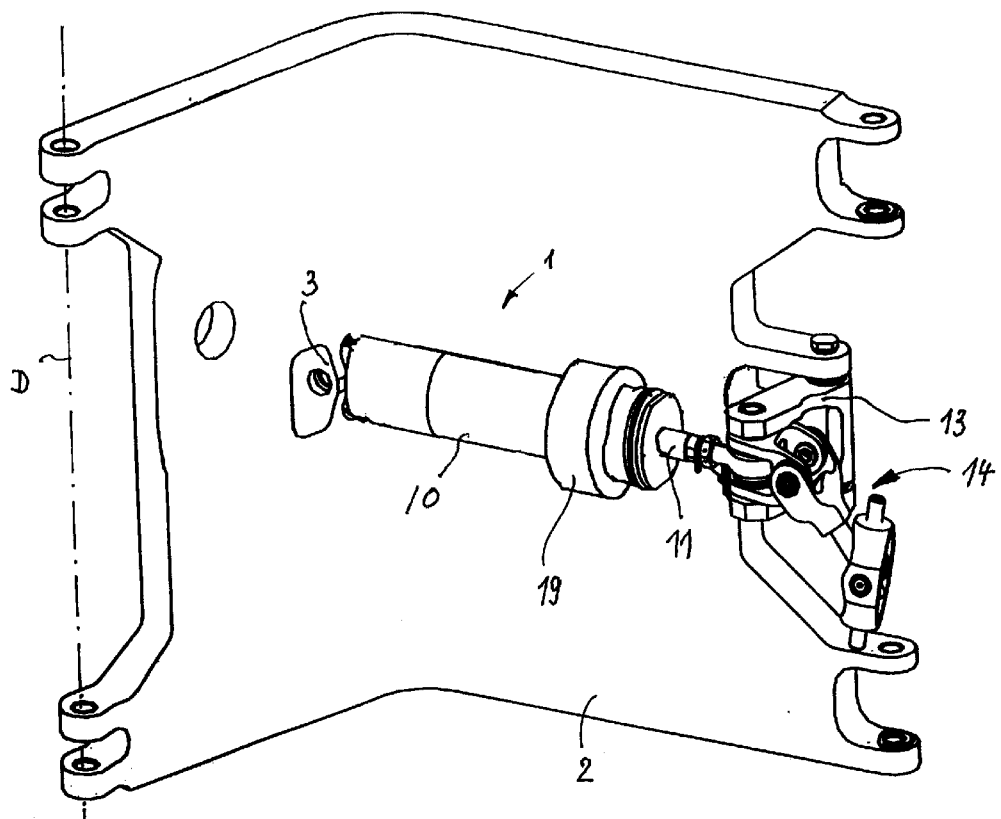
FIG. 1 is a perspective schematic view of a carrying arm of a passenger door with an emergency opening cylinder and constructed according to preferred embodiments of the invention.

FIG. 1 schematically illustrates a carrying arm 2 of a passenger door. At the fuselage-side frame of the passenger plane, the carrying arm 2 is held and disposed in an axis of rotation D. The devices for holding and bearing the carrying arm in the axis of rotation D are not shown. Furthermore, the emergency opening cylinder 1 is visible which is rotatably disposed on the carrying arm by means of a flange 3 arranged on the cylinder wall. The piston rod 11 connected with a cylinder piston protrudes from the emergency opening cylinder 1. The end of the piston rod 11 situated there is constructed as an eye which is held in a swivellable carrying device 13 of the carrying arm 2. The piston rod 11 carried in the swivellable carrying device 13 is further connected with a fitting 14 which is disposed in the structure of the passenger door. By way of the connection of the piston rod 11 with the swivellable carrying device 13 and the fitting 14, the force is transmitted from the piston rod 11 to the passenger door (not shown).

The valve-operated collecting chamber 19 is also visible.

Figure 2:
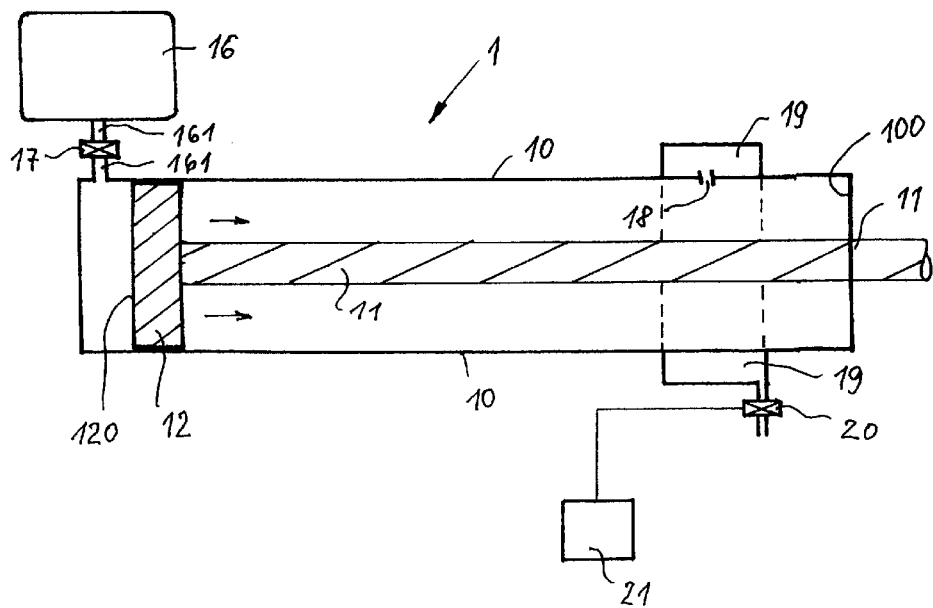
FIG. 2 is a basic diagram of an emergency opening cylinder with a valve-operated collecting chamber of the invention constructed according to preferred embodiments of the invention.

FIG. 2 shows additional details in a longitudinal sectional view of the emergency opening cylinder 1. In a gas cartridge 16, a gas is compressed during whose relaxation the piston 12 with the piston rod 11 is moved so that the weight of the passenger door to be opened (also against the force of gravity) can be swiveled. The gas cartridge 16 is connected with the cylinder 10, for example, by means of a duct 161. The mouth of the duct 161 in the cylinder 10 can be closed or opened by means of an emergency opening valve 17.

Only when the emergency opening valve 17 opens will the gas from the gas cartridge 16 arrive in the cylinder 10. The opening of the emergency opening valve 17 can take place, for example, mechanically, by piercing a membrane (not shown).

The opening of the emergency opening valve 17 takes place, for example, in the case of an implemented emergency landing. Here, a case is assumed in which the left running gear is broken and the passenger door arranged on the left fuselage side is to be opened, that is, swiveled, beyond an angle of 90° against the force of gravity. The door is unlocked and in the lifted position. The released gas pushes the piston 12 in the direction of the arrow and, in the process, the piston rod 11, by way of the fitting (14 (for example, a triangular control arm), causes the door to carry out a swivelling movement. As soon as the piston head 120 opens up the ventilation bore 18, the gas will escape from the cylinder 10. Nevertheless, additional force reserves are necessary in order to guide the door to an opening angle of approximately 140°. For this purpose, the existing cylinder 10 was surrounded in the area of its ventilation bore 18 with a valve-operated collecting chamber 19 in the circumferential direction. The outlet valve 20 of the collecting chamber 19 is closed. The collecting chamber 19 is placed in a collar-type manner over the ventilation bore 18 and is guided along the circumference of the cylinder 10. The collecting chamber 19 catches the gas escaping through the ventilation bore 18 and avoids an escape into the atmosphere. With the collected gas, the still existing force can be utilized for guiding the piston 12 to a stop 100 so that, while overcoming the force of gravity, the door can be swiveled into an end area of approximately 140°.

An advantage of the invention relates to the fact that the collecting chamber 19 can be installed subsequently on an existing cylinder 10. The installation expenditures are low and the change of the weight of the existing emergency opening cylinder 1 is insignificant. Nevertheless, it is achieved by means of the invention to adapt the operating characteristic of the emergency opening cylinder 1 to the described load situation. However, all other previous emergencies continue to be controllable.

In order to be able to close the passenger door again after an emergency opening, it should be possible to reduce the pressure inside the cylinder 10 and the collecting chamber 19, that is, to reduce it to zero. For this purpose, the outlet valve 20 is arranged in the collecting chamber 19. This outlet valve 20 connects the collecting chamber 19 with the outer atmosphere. When the piston 12 passes the ventilation bore 18, it still has to move along in the cylinder 10 to the stop 100, where an additional force capacity of the piston rod 11 is required and permitted by means of the collecting chamber 19. The opening of the outlet valve 20 takes place by means of a control 21. The control 21 can operate according to the time parameter (time delay) or the piston travel.

The ventilation is most easily carried out by way of the outlet valve 20 according to a time-dependent characteristic. The ventilation valve 20 is sealed off by means of suitable measures. By means of a time switch mechanism, the time period can be defined after which the outlet valve 20 starts to reduce the pressure in the emergency opening cylinder, so that a manual movement of the door can be carried out into its lifted position and thus a lowering of the passenger door in the closed position.

According to another development, the outlet valve 20, as a path-controlled valve, upon request, could also reduce the pressure in the collecting chamber 19 and in the cylinder 10. By means of a control mechanism, it is ensured that, only when the door is locked in the opening position, the force in the cylinder is reduced and an uncontrolled swivelling-back of the passenger door is avoided. It is conceivable that the signal for the outlet valve 20 takes place electromechanically or in a wireless manner by radio. The signal for the ventilation can be provided by the emergency opening cylinder 1 as well as by the door mechanism.

The advantage connected with a retrofitting of an existing emergency opening cylinder furthermore consists of an independence of adjusting tolerances. By means of a controlled outlet valve 20, the behavior of the entire system of the emergency opening cylinder is clearly improved at larger adjusting tolerances.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Gas operated emergency opening cylinder having a piston rod for swivelling a passenger door of an airplane, the emergency opening cylinder being a component of an emergency opening system of the passenger door, the emergency opening cylinder being arranged in use on a carrying arm bearing and carrying the door, with the piston rod being connected with the door, the emergency opening cylinder having a ventilation bore in an end area of its cylinder space through which the piston rod passes, wherein the ventilation bore (18) leads into a collecting chamber (19) which has an outlet valve (20) controllable by a control (21).

2. Gas-operated emergency opening cylinder according to claim 1, wherein the collecting chamber (19) is formed of a ring with a U-shaped cross-section which is guided along a cylinder circumference and can be fitted in a collar-type manner onto an outer wall of the emergency opening cylinder (1) in an area of the ventilation bore (18) and can be locked.

3. Gas-operated emergency opening cylinder according to claim 2, wherein the wall of the collecting chamber (19) carries the controllable outlet valve (20).

4. Gas-operated emergency opening cylinder according to claim 1, wherein the outlet valve (20) is in use initially closed and, with the passing of the ventilation bore (18) by the piston head (120), the control (21) opens the outlet valve (20) as a function of a time period or of a piston travel of the piston (12).

5. A method of modifying an airplane door emergency opening system which includes:
 a compressed gas source, and
 a piston cylinder unit including a cylinder and a piston movably disposed in said cylinder and operable in use to open an airplane door in response to gas supplied from the compressed gas source, said cylinder having a ventilation bore in an area of this cylinder space through which the piston rod passes,
 said method comprising installing a collecting chamber with a controllable outlet valve around the cylinder and the ventilation bore to thereby control escape of the compressed gas to the atmosphere and thereby increase the operating stroke of the cylinder piston unit.

6. A method according to claim 5, wherein the collecting chamber (19) is formed of a ring with a U-shaped cross-section which is guided along a cylinder circumference and can be fitted in a collar-type manner onto an outer wall of the emergency opening cylinder (1) in an area of the ventilation bore (18) and can be locked.

7. A method according to claim 6, wherein the wall of the collecting chamber (19) carries the controllable outlet valve (20).

8. A method according to claim 5, wherein the outlet valve (20) is in use initially closed and, with the passing of the ventilation bore (18) by the piston head (120), the control (21) opens the outlet valve (20) as a function of a time period or of a piston travel of the piston (12).

9. An airplane vehicle door assembly comprising:
 a door movable between a fuselage opening closed and open position; and
 an emergency opening system for opening the door including:
  a compressed gas source,
  a piston cylinder unit including a cylinder and a piston movably disposed in said cylinder and operable in use to open an airplane door in response to gas supplied from the compressed gas source, said cylinder having a ventilation bore in an area of this cylinder space through which the piston rod passes, and
  a collecting chamber with controllable outlet valve disposed around the cylinder and the ventilation bore to thereby control escape of the compressed gas to the atmosphere and thereby increase the operating stroke of the cylinder piston unit.

10. An assembly according to claim 9, wherein the collecting chamber (19) is formed of a ring with a U-shaped cross-section which is guided along a cylinder circumference and can be fitted in a collar-type manner onto an outer wall of the emergency opening cylinder (1) in an area of the ventilation bore (18) and can be locked.

11. An assembly according to claim 9, wherein the wall of the collecting chamber (19) carries the controllable outlet valve (20).

12. An assembly according to claim 9, wherein the outlet valve (20) is in use initially closed and, with the passing of the ventilation bore (18) by the piston head (120), the control (21) opens the outlet valve (20) as a function of a time period or of a piston travel of the piston (12).

\* \* \* \* \*